United States Patent [19]

Park

[11] Patent Number: 5,568,462
[45] Date of Patent: Oct. 22, 1996

[54] KNIFE EDGE METHOD FOR USE IN DETECTING A FOCUSSING ERROR IN AN OPTICAL PICKUP SYSTEM

[75] Inventor: Chan-Kyu Park, Seoul, Rep. of Korea

[73] Assignee: Daewoo Electronics Co., Ltd., Seoul, Rep. of Korea

[21] Appl. No.: 339,620

[22] Filed: Nov. 15, 1994

[30] Foreign Application Priority Data

Nov. 16, 1993 [KR] Rep. of Korea ............... 1993-24391

[51] Int. Cl.⁶ .................................................. G11B 7/00
[52] U.S. Cl. .......................... 369/112; 369/116; 369/120; 369/13
[58] Field of Search .................................. 369/112, 116, 369/120, 124, 118, 110, 13, 44.32

[56] References Cited

U.S. PATENT DOCUMENTS

| | | | |
|---|---|---|---|
| 4,873,678 | 10/1989 | Nakamura et al. | 369/13 |
| 5,231,621 | 7/1993 | Matsui et al. | 369/44.32 |
| 5,317,557 | 5/1994 | Goto | 369/112 |
| 5,357,499 | 10/1994 | Nomoto | 369/120 |
| 5,383,173 | 1/1995 | Kim et al. | 369/112 |

*Primary Examiner*—Loha Ben
*Attorney, Agent, or Firm*—Anderson, Kill & Olick P.C.

[57] ABSTRACT

The inventive knife edge method for use in an optical pick-up system capable of detecting a focussing error is comprised of a light source, an optical detector, a knife edge, an objective lens and a differential amplifier. The system is different from the optical pickup system utilizing a conventional knife edge method in that a beam splitter is absent in the inventive system. By eliminating the loss factor stemming from the presence of a beam splitter from the system, it is possible to increase the optical efficiency of the light beam.

2 Claims, 3 Drawing Sheets

KNIFE EDGE METHOD FOR USE IN DETECTING A FOCUSSING ERROR IN AN OPTICAL PICKUP SYSTEM

FIELD OF THE INVENTION

The present invention relates to an optical pickup system; and, more particularly, to an improved knife edge method for use in the system capable of providing an increased optical efficiency.

DESCRIPTION OF THE PRIOR ART

One of the common difficulties in an optical information recording disk, e.g., laser disk, lies in the occurrence of focussing errors. A knife edge method has been introduced to solve the problem.

In FIG. 1, there is illustrated one of the prior art optical pickup system 10 utilizing the knife edge method. The optical pickup system 10 comprises a light source 12, a beam splitter 14, an objective lens 16, an optical information recording disk 19 (hereinafter referred to as an optical disk), a knife edge 20, an optical detector 22, and a differential amplifier 28. In the system, a light beam 13 emitted from the light source 12, e.g., a laser diode, enters the beam splitter 14 and is partially reflected by a reflection surface 15 incorporated therein. The light beam reflected from the reflection surface 15 is radiated through the objective lens 16 onto a recording surface 18 of the optical disk 19 as a focussed light beam. The focussed light beam reflected from the optical disk 19 is converged by the objective lens 16 and transmitted through the beam splitter 14. The light beam is then made to pass by the knife edge 20, and thereafter, is made to impinge onto the optical detector 22 included therein a reception surface 27 provided with a pair of photoelectric cells. An output in the form of a light intensity measurement from each of the photoelectric cells is connected to a first and a second input ports 24, 26 of the differential amplifier 28, respectively, allowing the differential amplifier 28 to detect an associated focussing error by comparing the output from each of the photoelectric cells, the focussing error simply being a difference of the two outputs. The intensity of the light beam impinging on each of the light receiving portions of the reception surface 27 changes based on the positional relationship between the recording surface 18 of the optical disk 19 and a convergence point 17 of the light beam.

When the recording surface 18 of the optical disk and the convergence point 17 coincide, this is known as a "just focussed" position, and in such a case the intensity of the light beam impinging on each of the photoelectric cells is the same, and the output from each of the photoelectric cells, and hence, the input to the first and second input ports 24, 26 of the differential amplifier are identical, yielding a zero focussing error. If the recording surface 18 of the optical disk does not coincide with the convergence point 17, the intensity of the light beam impinging on each of the photoelectric cells is different from each other, thereby allowing the system to yield a focussing error signal of a non-zero value with the sign indicating the direction of displacement.

In such a system, the intensity of the light beam impinging on the reception surface 27 is calculated as:

$$i = rI * k * R_S^2 * R_0^2$$

wherein i represents the intensity of the light beam impinging on the reception surface 27, I, the light source intensity, r, the radiation loss factor, k, the loss factor of the knife edge, $R_S$, the loss factor of the beam splitter, and $R_0$, the loss factor of the objective lens. If r, I, k, $R_S$ and $R_0$ are 0.8, 0.3, 0.5, 0.5 and 0.97, respectively, then i becomes 0.028 mW. This conventional knife edge method requires the beam splitter 14 to obstruct a part of the light beam, to thereby reduce the optical efficiency of the light beam.

SUMMARY OF THE INVENTION

It is, therefore, a primary object of the present invention to provide an improved knife edge method for use in an optical pickup system capable of increasing the optical efficiency of the light beam.

In accordance with the present invention, there is provided an optical pickup system for determining a focussing error, comprising: a light source for generating a light beam; an optical detector, including a reception surface being equally divided to provide a first and a second photoelectric cells, each of the photoelectric cells generating an output in the form of a light intensity measurement focussing error signal, wherein a center of the reception surface of the optical detector and a convergence point located on an optical disk form an optical axis; a knife edge, provided with a reflection surface and disposed between the optical disk and the optical detector, for reflecting the light beam from the light source to the recording surface of the optical disk, utilizing the reflection surface thereof, wherein the knife edge is arranged in such a way that it is inclined at a predetermined angle Θ with respect to the optical axis; an objective lens, disposed between the knife edge and the optical disk, for converging the light beam reflected by the knife edge onto the recording surface and for converging the reflected light beam from the recording surface onto the knife edge and the optical detector; and a differential amplifier, connected to the first and the second photoelectric cells, for generating a focussing error signal by comparing the outputs from the first and second photoelectric cells of the optical detector.

BRIEF DESCRIPTION OF THE DRAWINGS

The present invention together with the above and other objects and advantages will become more apparent from the following description of preferred embodiment given in conjunction with the accompanying drawings, wherein.

DETAILED DESCRIPTION OF THE PREFERRED EMBODIMENT

Figure 1:
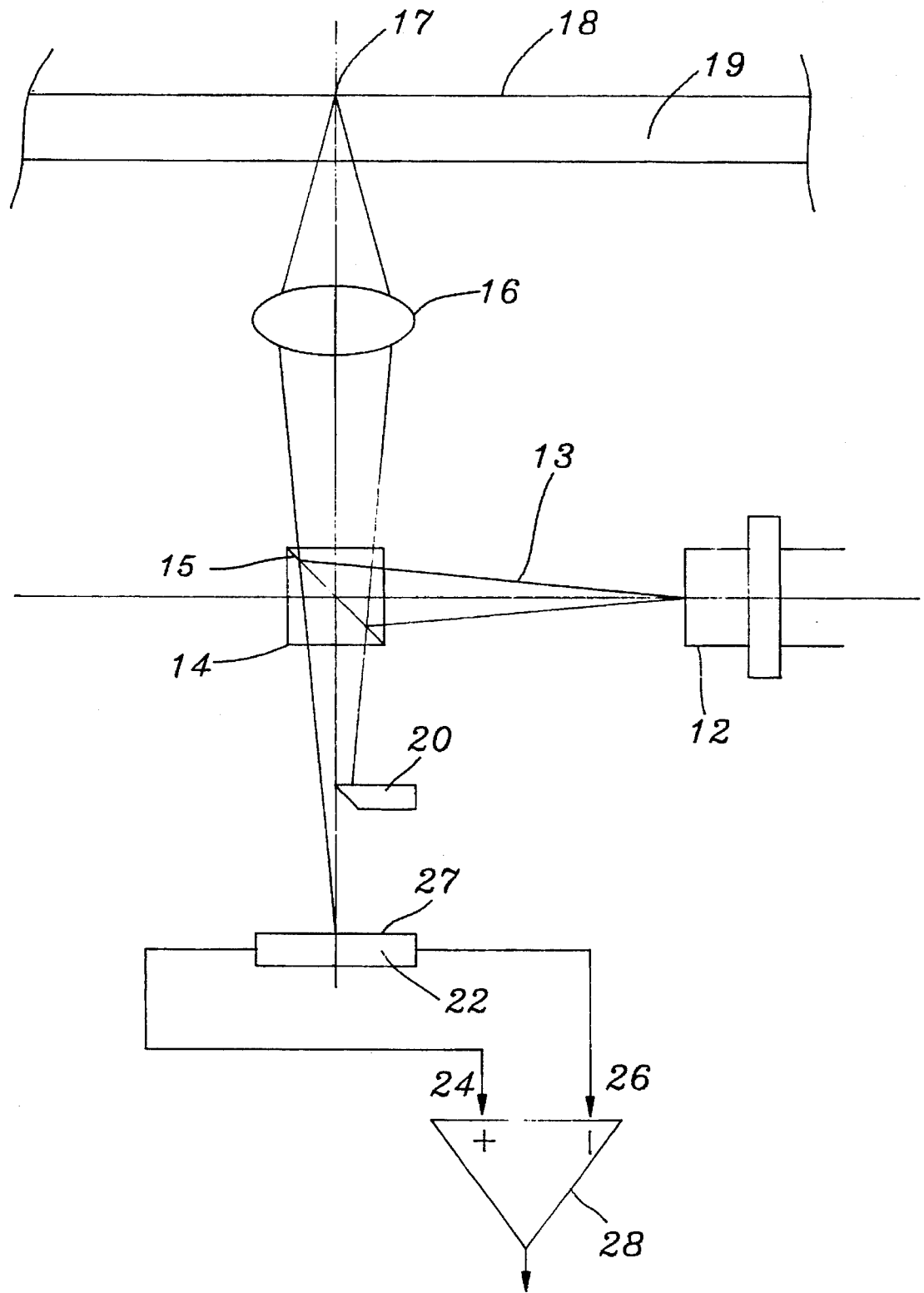
FIG. 1 represents a schematic view of a prior art optical pickup system utilizing a knife edge method.
Figure 2:
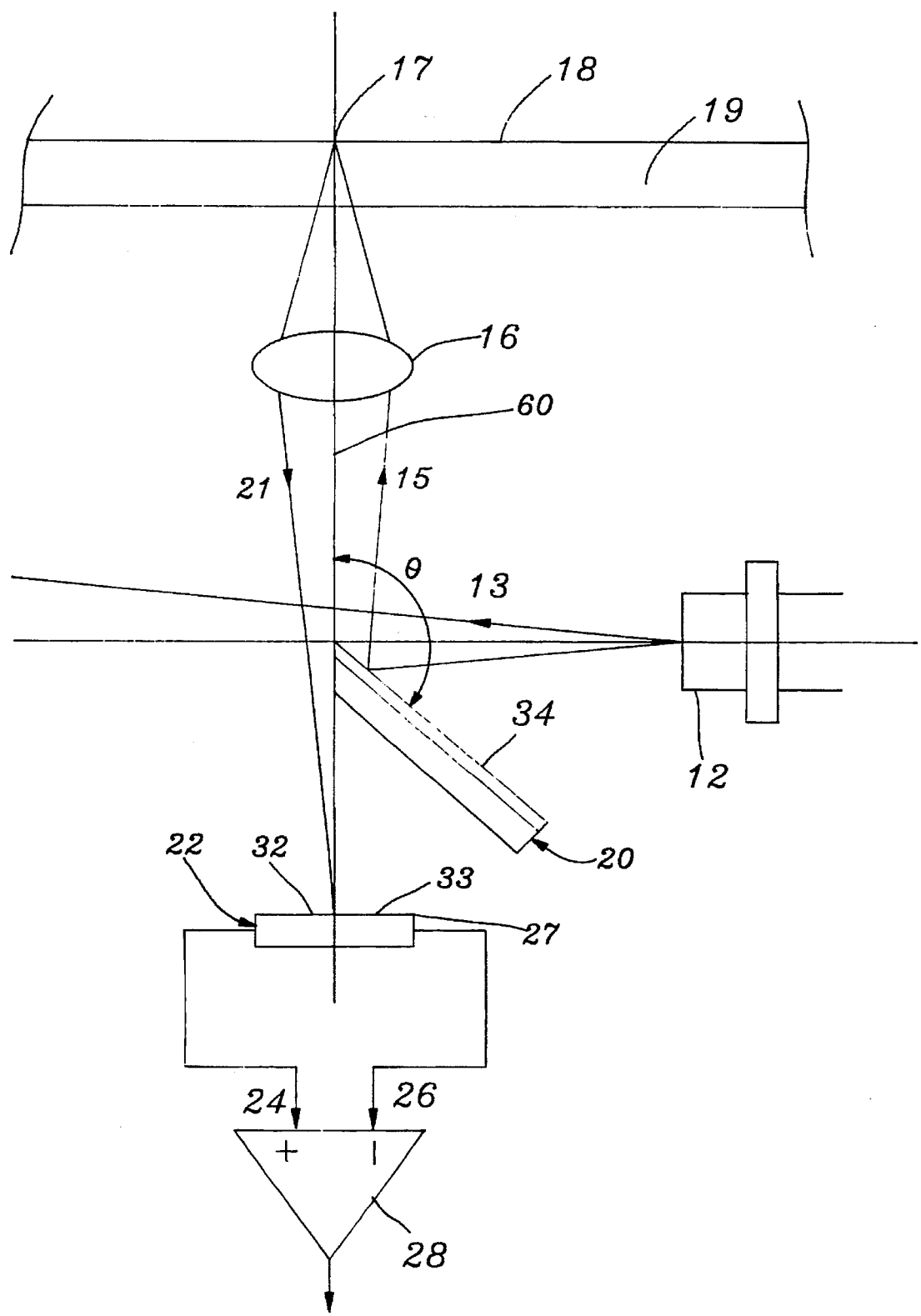
FIG. 2 illustrate a perspective view of the inventive knife edge method in accordance with a preferred embodiment of the present invention.
Figure 3A:
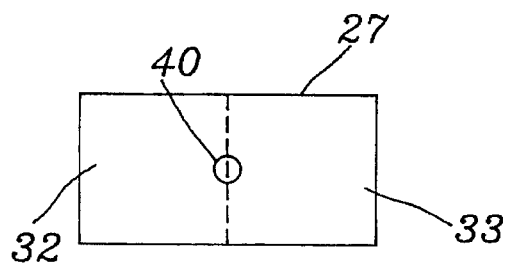
FIGS. 3A–3C exemplify of the cross-sectional luminous intensity distribution of the light beam impinging on the reception surface of the optical detector.
Figure 3B:
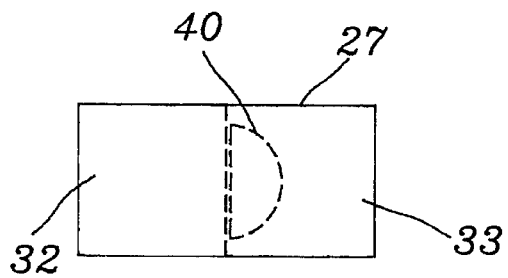
Figure 3C:
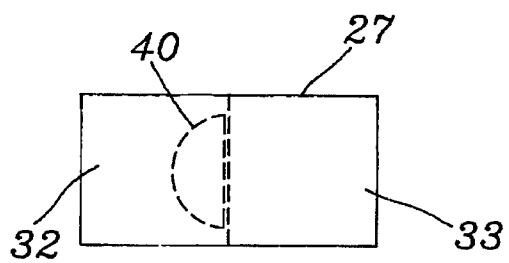
Figure 4:
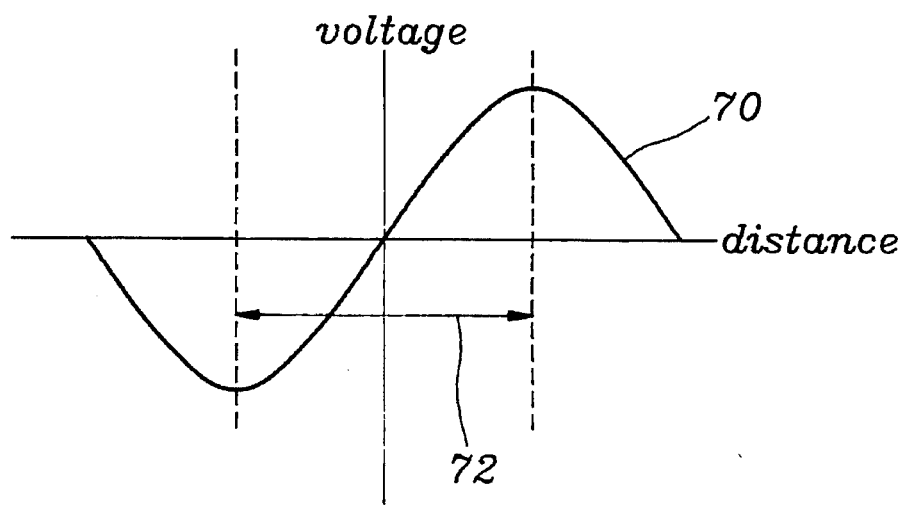
FIG. 4 depicts the relationship between the displacement of the optical disk and the intensity variation of a focussing error signal.

There are illustrated in FIGS. 2 to 4 various views of the inventive knife edge in accordance with a preferred embodiment of the present invention. It should be noted that like parts appearing therein have like reference numerals.

There is illustrated in FIG. 2 a perspective view of the inventive knife edge 20 for use in an optical pickup system 10 capable of detecting a focussing error, comprising a light source 12, an objective lens 16, an optical disk 19, a knife edge 20 having a reflection surface 34, a differential amplifier 28 and an optical detector 22 provided with a reception surface 27. In the system 10, a light beam 13 emitted from the light source 12, e.g., a laser diode, impinges onto the knife edge 20 and is partially reflected by a reflection surface 34 incorporated therein. The reflected light beam 15 from the reflection surface 34 is radiated through the objective lens 16 onto a recording surface 18 of the optical disk 19 as a focussed light beam. The knife edge 20 is arranged in such a way that the reflection surface 34 thereof is inclined at a predetermined angle Θ with an optical axis 60 formed by a center of the reception surface 27 of the optical detector 22 and a convergence point 17 on the optical disk the optical axis 60 being perpendicular to the center axis of the light beam 13 coming out of the light source 12. It is preferable that Θ be 135 degrees. The focussed light beam, reflected from the recording surface 18 of the optical disk 19, is converged by the objective lens 16 and then passed by the knife edge 20. The focussed light beam passes by the knife edge 20 impinges on the reception surface 27 of the optical detector, the reception surface 27 including a first and a second photoelectric cells 32, 33. Each of the photoelectric cells is capable of generating an output in the form of a light beam intensity measurement. Outputs from the first and second photoelectric cells are sent to a pair input ports 24, 26 on the differential amplifier 28 which generates a focussing error signal by comparing the outputs from the first and second photoelectric cells of the optical detector.

It should be noted that the light beam forms a semi-circle located on the center portion of the reception surface 27, since the knife edge cuts a circular beam spot in halves by completely blocking half of the reflected light beam from the recording surface 18 of the optical disk.

FIG. 3A shows the cross-sectional luminous intensity distribution 40 of the light beam impinging on the center of the reception surface 27 when the optical disk is placed on the just focussed position. It has the minimum spot size. If the optical disk 19 moves away from the optical detector 22, the cross-sectional luminous intensity distribution 40 of the light beam impinging on the reception surface 27 is partial toward the second photoelectric cells 33, as presented in FIG. 3B; and if the optical disk moves toward the optical detector 22, the cross-sectional luminous intensity distribution 40 of the light beam impinging on the reception surface 27 is partial toward to the first photoelectric cell 32 and the semi-circle beam shape formed is inverted at the center line with respect to the one shown in FIG. 3B (see FIG. 3C).

In the system 10, the intensity of the light beam 21 (depicted in FIG. 2) impinging on the reception surface 27 is calculated using the following relationship:

$$i = rI * k * R_0^2$$

wherein i represents the intensity of the light beam impinging on the reception surface 27, I, the light source intensity, r, the radiation loss factor, k, the loss factor of the knife edge, $R_0$, the loss factor of the objective lens. If the r, I, k and $R_0$ are 0.8, 0.3, 0.5 and 0.97, respectively, then i is 0.1129 mW. The intensity of the light beam impinging on the reception surface 27 of the present invention is 4 times larger than that of the prior art.

FIG. 4 illustrates a focussing error detecting signal curve 70 measured as a function of voltage and displacement. The arrow 72 therein indicates a focus control distance possible. In the system, the focus control distance ranges are about 15 μm.

As described above, it should be noted that the use of the inventive knife edge method in place of a conventional knife edge method in an optical pickup system increase the optical efficiency of the light beam since the inventive knife edge method eliminates the use of a beam splitter.

While the present invention has been described with respect to the preferred embodiments, other modifications and variations may be made without departing from the scope of the present invention as set forth in the following claims.

What is claimed is:

1. An optical pickup system for determining a focussing error comprising:

a light source for generating a light beam;

an optical detector, including a reception surface being equally divided to provide a first and a second photoelectric cells, each of the photoelectric cells generating an output in the form of a light intensity measurement, wherein a center of the reception surface of the optical detector and a convergence point located on an optical disk form an optical axis;

a knife edge, provided with a reflection surface and disposed between the optical disk and the optical detector, for reflecting the light beam from the light source to the recording surface of the optical disk, utilizing the reflection surface thereof, wherein the knife edge is arranged in such a way that it is inclined at a predetermined angle Θ with respect to the optical axis;

an objective lens, disposed between the knife edge and the optical disk, for converging the light beam reflected by the knife edge onto the recording surface and for converging the reflected light beam from the recording surface onto the knife edge and the optical detector; and a differential amplifier, connected to the first and the second photoelectric cells, for generating a focussing error signal by comparing the outputs from the first and second photoelectric cells of the optical detector.

2. The optical pickup system of claim 1, wherein the predetermined angle is 135 degrees.

* * * * *